(12) United States Patent
Frerich et al.

(10) Patent No.: US 9,443,045 B2
(45) Date of Patent: Sep. 13, 2016

(54) POWER ESTIMATION IN AN INTEGRATED CIRCUIT DESIGN FLOW

(75) Inventors: Jason A. Frerich, Bastrop, TX (US); Christopher M. Goertz, Red Rock, TX (US); Edward M. McCombs, Austin, TX (US)

(73) Assignee: Apple Inc., Cupertino, CA (US)

( * ) Notice: Subject to any disclaimer, the term of this patent is extended or adjusted under 35 U.S.C. 154(b) by 1359 days.

(21) Appl. No.: 13/183,335

(22) Filed: Jul. 14, 2011

(65) Prior Publication Data

US 2012/0203480 A1    Aug. 9, 2012

Related U.S. Application Data

(60) Provisional application No. 61/440,165, filed on Feb. 7, 2011.

(51) Int. Cl.
*G06F 17/00* (2006.01)
*G06F 17/50* (2006.01)

(52) U.S. Cl.
CPC ....... *G06F 17/5036* (2013.01); *G06F 2217/78* (2013.01)

(58) Field of Classification Search
USPC ......................................................... 702/60
See application file for complete search history.

(56) References Cited

U.S. PATENT DOCUMENTS

| | | | | |
|---|---|---|---|---|
| 5,687,355 A * | 11/1997 | Joardar et al. | ..................... | 703/2 |
| 5,752,002 A * | 5/1998 | Naidu et al. | ..................... | 703/14 |
| 5,838,947 A * | 11/1998 | Sarin | ................... | G06F 17/5022 703/14 |
| 6,125,334 A * | 9/2000 | Hurd | ............................... | 702/60 |
| 6,249,898 B1 * | 6/2001 | Koh et al. | ..................... | 716/109 |
| 6,345,379 B1 * | 2/2002 | Khouja et al. | ................ | 716/115 |
| 6,393,601 B1 * | 5/2002 | Tanaka et al. | .................. | 716/113 |
| 6,578,176 B1 * | 6/2003 | Wang et al. | .................. | 716/133 |
| 7,000,204 B2 | 2/2006 | McGuffin et al. | | |
| 7,134,100 B2 | 11/2006 | Ravi et al. | | |
| 7,331,022 B1 * | 2/2008 | Pritchard et al. | ............. | 716/126 |
| 7,395,524 B2 * | 7/2008 | Roesner et al. | .............. | 717/114 |
| 7,739,629 B2 | 6/2010 | Wang et al. | | |
| 7,870,521 B2 * | 1/2011 | Palisetti | ........................ | 716/136 |
| 8,095,354 B2 * | 1/2012 | Tamaki et al. | .................. | 703/18 |
| 8,146,035 B1 * | 3/2012 | Schumacher et al. | ........ | 716/109 |
| 8,201,137 B1 * | 6/2012 | Bhushan et al. | .............. | 716/139 |
| 8,356,270 B2 * | 1/2013 | Burd et al. | ..................... | 716/136 |

(Continued)

*Primary Examiner* — Mischita Henson
(74) *Attorney, Agent, or Firm* — Anthony M. Petro; Meyertons, Hood, Kivlin, Kowert & Goetzel, P.C.

(57) ABSTRACT

Power estimates for an integrated circuit may be obtained without having to individually enter monitor statements at hierarchical levels in a design. The current, or consumed power may be considered at the transistor level throughout the entire circuit, even when the circuit is divided into hierarchical modules. Current, or power measurements may be obtained after a circuit has been synthesized and an extracted transistor-level netlist has been created. Separate netlists may be created for different modules, and estimate results collected from the different modules, since current measurements are performed at the transistor level. To accurately estimate the power consumption, the current flowing through transistors that are connected to power rails in the netlist may be measured during circuit simulation. This may be accomplished via measurement statements created for these transistors, and placed in a simulation input file, by a script or program, for example. Only the currents flowing through these transistors need to be measured to account for all the current provided from the power sources in the design.

23 Claims, 4 Drawing Sheets

(56) References Cited

U.S. PATENT DOCUMENTS

| | | | |
|---|---|---|---|
| 2004/0143807 A1* | 7/2004 | Hegde et al. | 716/11 |
| 2004/0143808 A1* | 7/2004 | Hegde et al. | 716/11 |
| 2004/0186703 A1* | 9/2004 | Radjassamy | 703/18 |
| 2005/0034089 A1* | 2/2005 | McGuffin et al. | 716/5 |
| 2005/0050495 A1* | 3/2005 | McGuffin et al. | 716/5 |
| 2005/0138579 A1* | 6/2005 | Narendra et al. | 716/2 |
| 2007/0204215 A1* | 8/2007 | Mueller et al. | 715/514 |
| 2008/0203403 A1* | 8/2008 | Kawahara et al. | 257/80 |
| 2010/0095262 A1* | 4/2010 | Garg et al. | 716/9 |
| 2011/0270548 A1* | 11/2011 | Zuo et al. | 702/60 |

* cited by examiner

POWER ESTIMATION IN AN INTEGRATED CIRCUIT DESIGN FLOW

PRIORITY INFORMATION

This patent application claims priority to Provisional Patent Application Ser. No. 61/440,165, filed Feb. 7, 2011, titled "Power Estimation in an Integrated Circuit Design Flow", whose inventors are Jason A. Frerich, Christopher M. Goertz, and Edward M. McCombs, and which is incorporated herein by reference in its entirety.

BACKGROUND

1. Technical Field

This disclosure relates to integrated circuit design, and more particularly to estimating power in an integrated circuit design.

2. Description of the Related Art

Integrated circuit design flow is a complex process. An important part of the design process is the simulation performed on models of the integrated circuit at various levels of the design hierarchy, for example at system level, logic level, and/or circuit level. The circuit models are oftentimes created with use of a hardware description language (HDL) such as Verilog or VHDL (Very high level integrated circuits Hardware Description Language). Generally, a synthesis program is used to generate a netlist from the HDL models, making use of standard cell libraries containing a variety of circuit elements from which the integrated circuit may be constructed. Netlists usually include instances of the standard cells contained in the design, with the possible inclusion of custom blocks, and information descriptive of the connectivity between all the instances included in the integrated circuit. There are different types of netlists that can be used, including physical and logical netlists, instance-based and net-based netlists, and flat and hierarchical netlists. In many cases circuit power estimation is critical. This is particularly true in the case of circuits intended for mobile applications. Various simulations may be performed on circuit models of circuits to be fabricated for use in mobile applications.

In many cases, SPICE (Simulation Program with Integrated Circuit Emphasis) simulations are performed to generate and cull at least a portion of the information pertaining to projected power consumption of the integrated circuit/system. Running SPICE simulations can be error prone, however, when manually placing monitor statements into the netlist at different levels of hierarchy. In addition, providing fine-grained power measurement is typically difficult to achieve when instrumenting the SPICE circuit model using, for example, monitor statements.

SUMMARY OF THE INVENTION

In one set of embodiments, desired current measurement estimates, or consumed-power measurement estimates for an integrated circuit may be obtained without having to individually enter monitor statements at hierarchical levels in a design. In other words, instead of performing measurement estimates at hierarchical levels, the current, or consumed power may be considered at the transistor level throughout the entire circuit, even when the circuit is divided into hierarchical modules. Current, or power measurements may be obtained once a circuit design has been synthesized and an extracted transistor-level netlist has been created. The netlist may be saved in a standard format such as a Detailed Standard Parasitic Format (DSPF), for example. Separate netlists may be created for different modules, and estimate results collected from the different modules, since current measurements are still performed at the transistor level. The extracted netlist may include a listing of all circuit components including all the transistors in the design. To accurately estimate the power consumption in the design, or to accurately estimate the current that is sourced by one or more voltage supplies in the design, the current flowing through transistors connected to the power rails may be measured as part of the circuit simulation. Since the transistors connected to $V_{DD}$ power rails, or variations of the $V_{DD}$ power rails are of interest, only the current flowing through these transistors may need to be measured to account for all the current provided from the power sources in the design.

In one set of embodiments, power in an integrated circuit may be estimated/measured by identifying, within a netlist representing the integrated circuit, one or more transistors coupled to a voltage supply for which power is to be estimated. A respective measurement statement may be generated for each of the one or more transistors, with the respective measurement statement usable by a circuit simulation tool to measure a current flowing through the transistor during a simulation of the integrated circuit. A measurement file may be created, and all the respective measurement statements may be placed within the measurement file, with the measurement file usable by the circuit simulation tool for performing the simulation of the integrated circuit. The integrated circuit may then be simulated according to at least the measurement file, and a corresponding output file may be generated. Subsequently, results from at least some of the respective measurement statements may be extracted from the corresponding output file, and a power report may be generated based on theses extracted results.

Once the power report has been generated, a graphical representation of a power estimate for the integrated circuit may also be created based on the power report. In addition, a log file corresponding to the simulation of the integrated circuit may be generated, and information associated with the simulation of the integrated circuit may be extracted from the log file, and examined to determine whether the simulation was valid. Some of the information associated with the simulation of the integrated circuit that may be examined includes temperature information, supply voltage information, process parameter information, clock frequency information, and/or operating mode information. In some embodiments, the operating mode information may be indicative of a read operation, a write operation, a standby operation and/or any specific operation designated by the designer. Depending on the given system being designed, other operations may be specified by the designer, and the operating mode may be specified according to which of these specified operations are selected for any given simulation.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Figure 1:
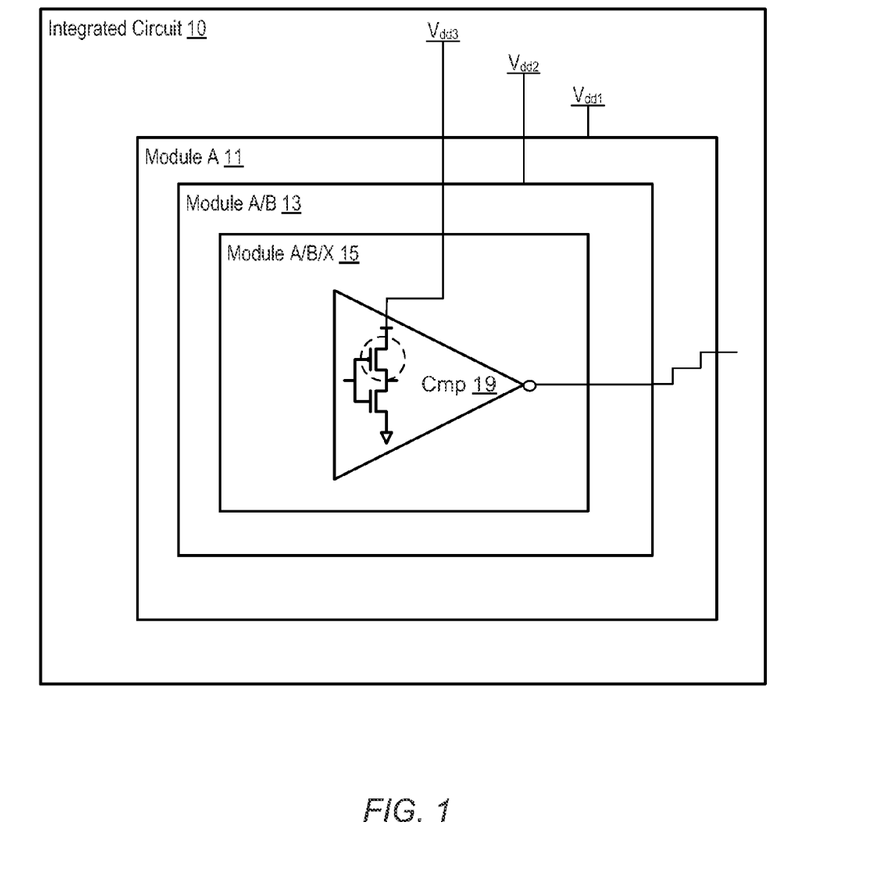
FIG. 1 is a block diagram of one embodiment of an integrated circuit.

FIG. 1 shows a block diagram of one embodiment of an integrated circuit 10. A typical integrated circuit (IC) such as IC 10 includes many circuit blocks, and each of those circuit blocks may be implemented within a number of modules and/or hierarchies. In the illustrated embodiment, IC 10 includes a module A 11, which includes a sub-module designated as module A/B 13, which itself includes a sub-module designated as module A/B/X 15. The module A/B/X 15 includes a comparator unit designated as CMP 19, which includes a number of transistors in various configurations. A representative CMOS inverter is shown within the CMP 19 for illustrative purposes. As described above, during the design of an IC, it is important to have the ability to determine the power, and thus the current drawn by the IC. In addition, it may also be important to determine the current drawn by any module, circuit block, or even a given transistor (dashed circle) within a particular circuit. However, as described above, this can be an arduous task for a circuit designer, and the process can be error prone unless great care is taken to ensure that the netlist is edited correctly.

As described in greater detail below, the desired current measurement estimates, or consumed-power measurement estimates may be obtained in a different manner. More particularly, instead of performing measurement estimates at hierarchical levels, the current, or consumed power may be considered at the transistor level throughout the entire design, and obtained once a circuit design has been synthesized and an extracted transistor-level netlist has been created. The netlist may be saved in a format such as a Detailed Standard Parasitic Format (DSPF), for example. The extracted netlist may include a listing of all circuit components including all transistors in the design. In one embodiment, to accurately estimate the power consumption in the design, or the current that is sourced by a voltage supply in the design, the current flowing through transistors that are connected to the power rails may be measured as part of the circuit simulation. Accordingly, transistors connected to $V_{DD}$ power rails, or variations of the $V_{DD}$ power rails may be of interest, and thus the current through these transistors may be measured, to account for all the current provided from the power sources in the design.

As shown in FIG. 1, the overall design may include multiple $V_{DD}$ power rails. For example, IC 10 may have a power rail design in which module A 11 is provided power from power rail $V_{DD1}$, module A/B 13 is provided power from power rail $V_{DD2}$, and module A/B/X 15 is provided power from power rail $V_{DD3}$. In one set of embodiments, power rails $V_{DD1}$, $V_{DD2}$, and $V_{DD3}$ may provide different supply voltages, while in another set of embodiments they may represent one power source and/or the same supply voltage value for powering the entire IC 10. In the embodiment shown in FIG. 1, comparator 19 is shown being powered by $V_{DD3}$. The extracted netlist may include a listing of all circuit components, including all the transistors in the design even in case two or more of the power rails shown (i.e. $V_{DD1}$, $V_{DD2}$, and $V_{DD3}$), are different. In other words, IC 10 may be organized by respective modules delimited by which of the different power rails is used to power each respective module, as shown in FIG. 1. For each respective module, the current flowing through transistors that are connected to the respective $V_{DD}$ power rail—powering that respective module—may be measured. Therefore, power estimation may be performed on the top (chip) level, as well as on each module level, providing maximum flexibility and design modularity, with the top level power estimation obtained by adding together the power estimates obtained for the individual modules, or by simply obtaining the overall power for the entire "flattened" netlist. It should also be noted, that one or more of the $V_{DD}$ power rails may be derived from other ones of the power rails. For example, in one set of embodiments, $V_{DD2}$ may be derived from $V_{DD1}$, and/or $V_{DD3}$ may be derived from $V_{DD2}$ or $V_{DD1}$, or some or all of the power rails may be derived from yet another power rail, not shown. Various such combinations are possible and are contemplated.

Figure 2:
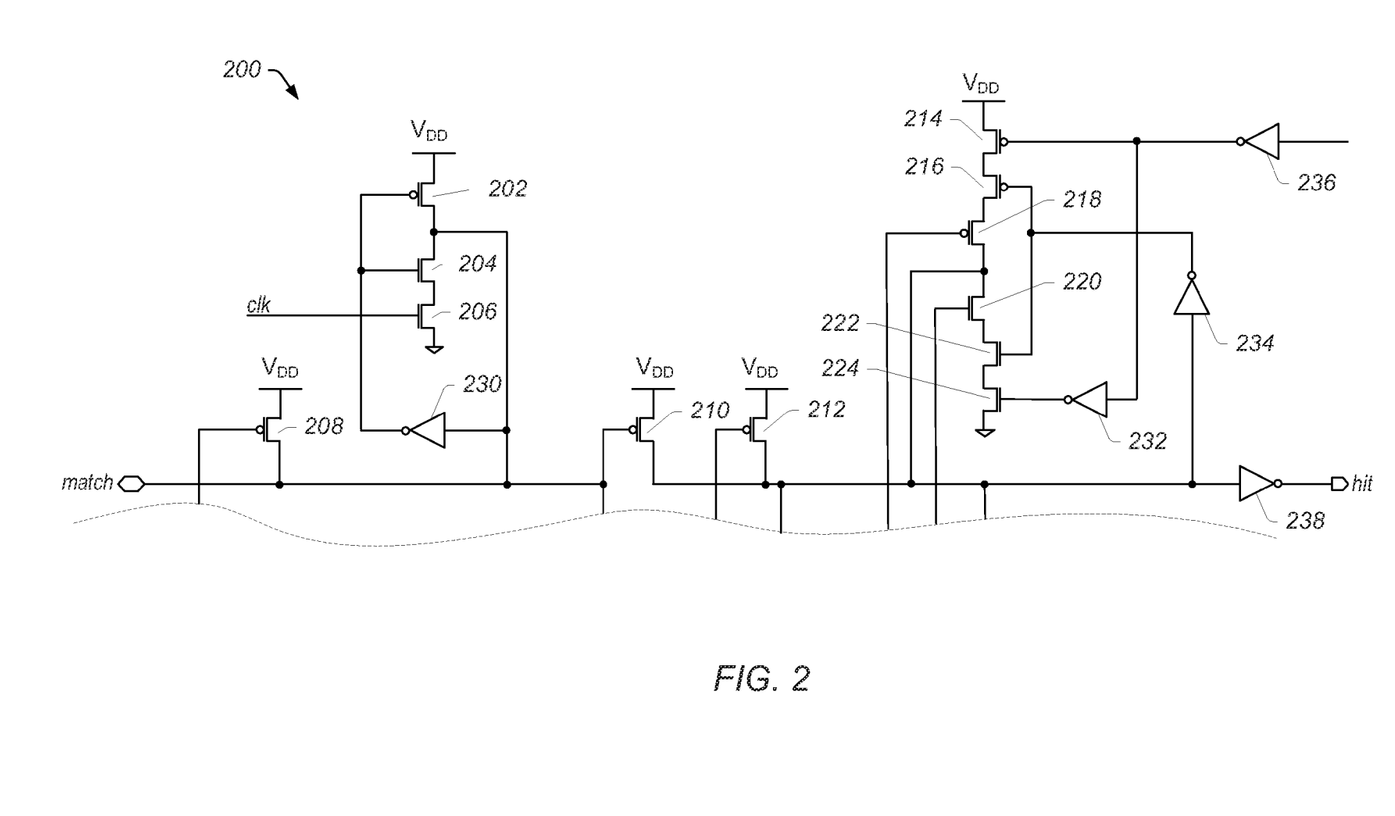
FIG. 2 is an exemplary circuit schematic of a portion of an embodiment of the circuit block shown in FIG. 1, for which a power estimation may be made.

FIG. 2 shows an exemplary circuit schematic of a portion of one embodiment of the circuit block shown in FIG. 1, for which power estimation may be made. For simplicity of illustration, only the portion of the circuit that is of interest for power estimation is shown (i.e. only the portion of the circuit that includes devices in the circuit that are connected to the power rails). Furthermore, also for simplicity of illustration, the circuit is shown as powered by a single power rail $V_{DD}$. The circuit 200 includes several transistors designated 202-224, and five inverters designated 230-238. As shown, transistors 202, 208, 210, 212, and 214 are connected to the $V_{DD}$ power rail, and each of inverters 230-238 also receive power from the $V_{DD}$ power rail. Accordingly, the current through these transistors, and the transistors also connected to the power rail within inverters 230-238 may be measured. The current through these transistors may be representative of the total current through the respective branches of the circuit to which they are connected. In one set of embodiments, the current measurements may be used with the respective supply voltage values to determine the power supplied to the modules/IC in question.

An exemplary partial listing from a DSPF file that corresponds to the circuit of FIG. 2 is shown below for transistor 208 (indicated as MP1 in the DSPF file) and transistor 210 (indicated as MP47 in the DSPF file), for illustrative purposes.

Figure 3A:
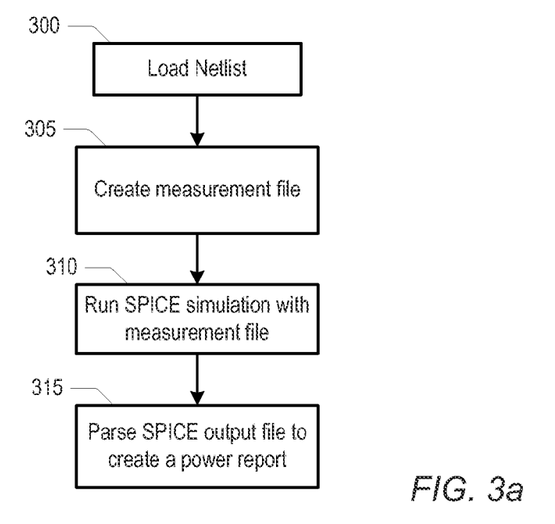
FIG. 3a is a flow diagram depicting an operational flow for generating a power estimation for a circuit design.

A/AB/ABX/Cmp/MP1 A/AB/ABX/Cmp/MP1:d A/AB/ABX/Cmp/MP1:g vdd vdd pfet SA=1.73 u SB=0.11 u SCA=137.425 SCB=0.055 SCC=0.012 SD=0 ad=0.049 p as=0.077 p cnr_switch=11=0.04 u m=1 nf=1 nrd=0.1 nrs=0.157 par=1 pccrit=1 pd=0.84 u ps=1.62 u ptwell=0 w=0.7 u A/AB/ABX/Cmp/MP1@2 A/AB/ABX/Cmp/MP1@2:d A/AB/ABX/Cmp/MP1@2:g vdd vdd pfet SA=1.55 u SB=0.29 u SCA=136.995 SCB=0.054 SCC=0.012 SD=0 ad=0.049 p as=0.049 p cnr_switch=11=0.04 u m=1 nf=1 nrd=0.1 nrs=0.1 par=1 pccrit=1 pd=0.84 u ps=0.84 u ptwell=0 w=0.7 u A/AB/ABX/Cmp/MP1@3 A/AB/ABX/Cmp/MP1@3:d A/AB/ABX/Cmp/MP1@3:g vdd vdd pfet SA=1.37 u SB=0.47 u SCA=136.994 SCB=0.054 SCC=0.012 SD=0 ad=0.049 p as=0.049 p cnr_switch=11=0.04 u m=1 nf=1 nrd=0.1 nrs=0.1 par=1 pccrit=1 pd=0.84 u ps=0.84 u ptwell=0 w=0.7):

A/AB/ABX/Cmp/MP1@4 A/AB/ABX/Cmp/MP1@4:d A/AB/ABX/Cmp/MP1@4:g vdd vdd pfet SA=1.19 u SB=0.65 u SCA=137.417 SCB=0.055 SCC=0.012 SD=0 ad=0.049 p as=0.049 p cnr_switch11=0.04 u m=1 nf=1 urd=0.1 nrs=0.1 par=1 pccrit=1 pd=0.84 u ps=0.84 u ptwell=0 w=0.7 u A/AB/ABX/Cmp/MP1@5 A/AR/ABX/Cmp/MP1@5:d A/AB/ABX/Cmp/MP1@5:g vdd vdd pfet SA=1.01 u SB=0.83 u SCA=106.617 SCB=0.033 SCC=0.008 SD=0 ad=0.049 p as=0.049 p cnr_switch=11=0.04 u m=1 nf=1 nrd=0.1 nrs=0.1 par=1 pccrit=1 pd=0.84 u ps=0.84 u ptwell=0 w=0.7 u A/AB/ABX/Cmp/MP47 A/AB/ABX/Crop/MP47:d A/AB/ABX/Cmp/MP47:g vdd vdd pfet SA=0.83 u SB=0.11 u SCA=147.712 SCB=0.039 SCC=0.016 SD=0 ad=0.11 p as=0.07 p cnr_switch=01=0.04 u m=1 nf=1 nrd=0.11 nrs=0.07 par=1 pccrit=1 pd=2.22 u ps=1.14 u ptwell=0 w=1 u A/AB/ABX/Cmp/MP47@2 A/AB/ABX/Cmp/MP47@2:d A/AB/ABX/Cmp/MP47@2:g vdd vdd pfet SA=0.65 u SB=0.29 u SCA=47.39 SCB=0.038 SCC=0.007 SD=0 ad=0.07 p as=0.07 p cnr_switch=01=0.04 u m=1 nf=1 nrd=0.07 nrs=0.07 par=1 pccrit=1 pd=1.14 u ps=1.14 u ptwell=0 w=1 u A/AB/ABX/Cmp/MP47@3 A/AB/ABX/Cmp/MP47@3:d A/AB/ABX/Cmp/MP47@3:g vdd vdd pfet SA=0.83 u SB=0.11 u SCA=151.638 SCB=0.045 SCC=0.016 SD=0 ad=0.11 p as=0.07 p cnr_switch=01=0.04 u m=1 nf=1 nrd=0.11 nrs=0.07 par=1 pccrit=1 pd=2.22 u ps=1.14 u ptwell=0 w=1 u A/AB/ABX/Cmp/MP47@4 A/AB/ABX/Cmp/MP47@4:d A/AB/ABX/Cmp/MP47@4:g vdd vdd pfet SA=0.65 u SB=0.29 u SCA=52.678 SCB=0.045 SCC=0.007 SD=0 ad=0.07 p as=0.07 p cnr_switch=01=0.04 u m=1 nf=1 nrd=0.07 nrs=0.07 par=1 pccrit=1 pd=1.14 u ps=1.14 u ptwell=0 w=1 u The transistors to be measured may be identified in the DSPF file, and once those transistors have been identified, measurement statements that may be used during circuit simulation may be created. The simulation may be run with the measurement statements, and the simulation output file may be used to determine the current drawn by the transistors of interest. In FIG. 3a, a flow diagram illustrates an embodiment of a design flow that may be used to provide a power estimate for the circuit design.

As shown in FIG. 3a, a parasitics extracted netlist such as a DSPF netlist is loaded and accessed (block 300). A measurement file that may be used during a circuit simulation is created. More particularly, in one embodiment a simulation tool, such as a version of the well-known SPICE simulator, or the like, may be used to simulate the circuit during operation. To extract measurement data during a SPICE simulation, various measure statements may be used with SPICE. Accordingly, rather than edit the netlist directly, a measurement file may be created and used by SPICE during simulation (block 305). The measurement file may include a number of '.measure' statements that measure the current through the transistors and components of interest in the design for as many cycles as are needed. For example, a measurement statement to measure the current through transistor 208 (indicated as MP1) for one cycle may look like the following:

.measure@_cycle1_A/AB/ABX/Cmp/MP1 avg i(A/AB/ABX/Cmp/MP1.main) from=0 ps to=500 ps In addition, measurement statements may be created to measure the current for an entire circuit block, and/or the entire integrated circuit, as well. In one embodiment, the measurement file may be created in an automated fashion through the use of a script, while in other embodiments, the measurement file may be created by hand. Once the measurement file has been created, the simulation may be run using the measurement file, and an output file may be generated and saved (block 310).

Information may then be extracted from the simulation output file. In one embodiment, the output file may be parsed for the pertinent data. This data may then be manipulated in any desired fashion to create a power report (block 315) so that the power consumed may be viewed at the top level of the design, or at or within each hierarchy as desired, down to a single transistor. In one embodiment, the output file data may have the following form:

Measurement resists:
@_cycle1_A/AB/ABX/Cmp/MP1=2.094487727240e-07

In one embodiment, the data may be extracted from the output file in an automated fashion using for example, a script file, while in other embodiments the data may be extracted manually. It is noted that one or more of the steps performed in the flow diagram of FIG. 3a, may be performed using script files that execute either as a stand alone design tool or as part of and within a synthesis/simulation tool.

In one set of embodiments, the simulations may be ran to estimate power for different possible operating modes. For example, a simulation may be performed for a write operation, which involves parts or all of the circuit under test. Similarly, simulations may be performed for read operations, standby, or for any other designated operating mode applicable to the circuit or design for which the power estimates are to be obtained. Depending on the given system being designed, various operations may be specified by the designer, and the operating mode may be specified according to which of these specified operations are selected for any given simulation. Each simulation may be configured according to a specified set of parameters, which may also be varied to obtain power estimates under various different conditions. For example, a power estimate may be made for a specific temperature or temperature range, different supply voltage values, different process parameters, different clock frequencies, etc. Thus, when simulating the design using the measurement file (block 310 in FIG. 3a, for example), any or all of these parameters and operating modes may be changed for obtaining corresponding power estimates for different parameter and operating mode combinations.

Figure 3B:
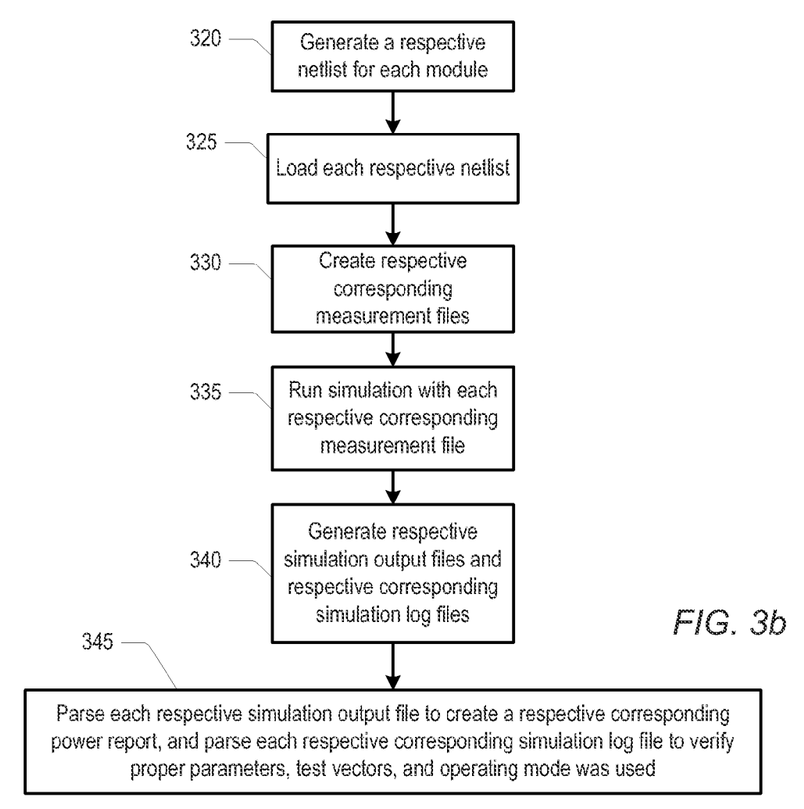
FIG. 3b is a flow diagram depicting an operational flow for generating a power estimation for a circuit design that includes multiple modules in a hierarchy.

In some embodiments, in addition to generating a simulation results file, a corresponding log file may also be generated. The log file may include information corresponding to the completed simulation run, including the different parameters and operating mode information corresponding to the simulation. The log files may be read by an application or a script to ensure that the proper or expected test vectors were used during the simulation, and the desired power estimates may be obtained from the simulation output file. FIG. 3b shows a flowchart of one embodiment in which separate simulations may be performed on hierarchical modules 11, 13, and 15 shown in FIG. 1. A respective netlist may be generated for each module (block 320), and the transistors of interest may be identified in each netlist, once the netlists have been loaded (block 325). Upon identifying the transistors of interest, respective corresponding measurement files may be created (block 330), which may include the measurement statements to be used during simulation to gather the requisite information (e.g. current flowing through the transistors of interest) to be used to perform the power estimation.

Simulations may then be run on each module, using the respective corresponding netlist and simulation/measurement file (block 335). Once the simulations have completed, or even during the simulations once the simulations have begun, respective corresponding simulation output files for each module may be generated (block 340). That is, simulation output may be continuously generated and output to a respective corresponding output file, which may be finalized once the simulation has completed. Alternately, simulation data may be generated and stored temporarily, and assembled into a final output file once the simulation has completed. Similarly, a respective corresponding log file may also be generated for each simulation (block 340). Each respective simulation output file may then be parsed to create a respective corresponding power report (block 345) for each module. In addition, each respective corresponding simulation log file may also be parsed to ensure that proper test vectors and parameters were used when simulating each module (block 345). In some embodiments, a script or program may also be executed to generate a single power report from the respective simulation output files, instead of generating a respective corresponding power report for each module. Overall, power reports may be generated as required, whether as a separate report for each module netlist in a hierarchical structure, or a combined report for the entire integrated circuit. By parsing the log files, the validity of each report may be confirmed, and simulations may be repeated if it is discovered from the log file that unexpected parameters or test vectors were used for a given simulation.

In some embodiments, the power reports may be saved in a variety of formats for use in analysis and/or further design activity. For example, the power reports may be saved as Microsoft Excel spreadsheet files, or embedded in an html file for access over the World Wide Web, or in one of a variety of data formats to be displayed as charts for quick visual overview. The power report may further be visually displayed according to a variety of different types of visual representations, and the information contained in the power reports may be organized according to selected criteria. In some embodiments, a graphical user interface (GUI) may be used to access the power reports, and display the results according to the selected criteria. Multiple power reports obtained for the same module or design/integrated circuit may also be used as input to the GUI, to compare power reports for the same netlist simulated for different modes (e.g. read, write, standby, etc.), according to different parameters (e.g. different temperature, clock cycle, supply voltage, device models, process parameters, etc.).

As in the case of FIG. 3a, in one embodiment, the data may be extracted from the respective output files in an automated a fashion using for example, a script file, while in other embodiments the data may be extracted manually. It is noted that one or more of the steps performed in the flow diagram of FIG. 3b, may also be performed using script files that execute either as a standalone design tool or as part of and within a synthesis/simulation tool.

Figure 4:
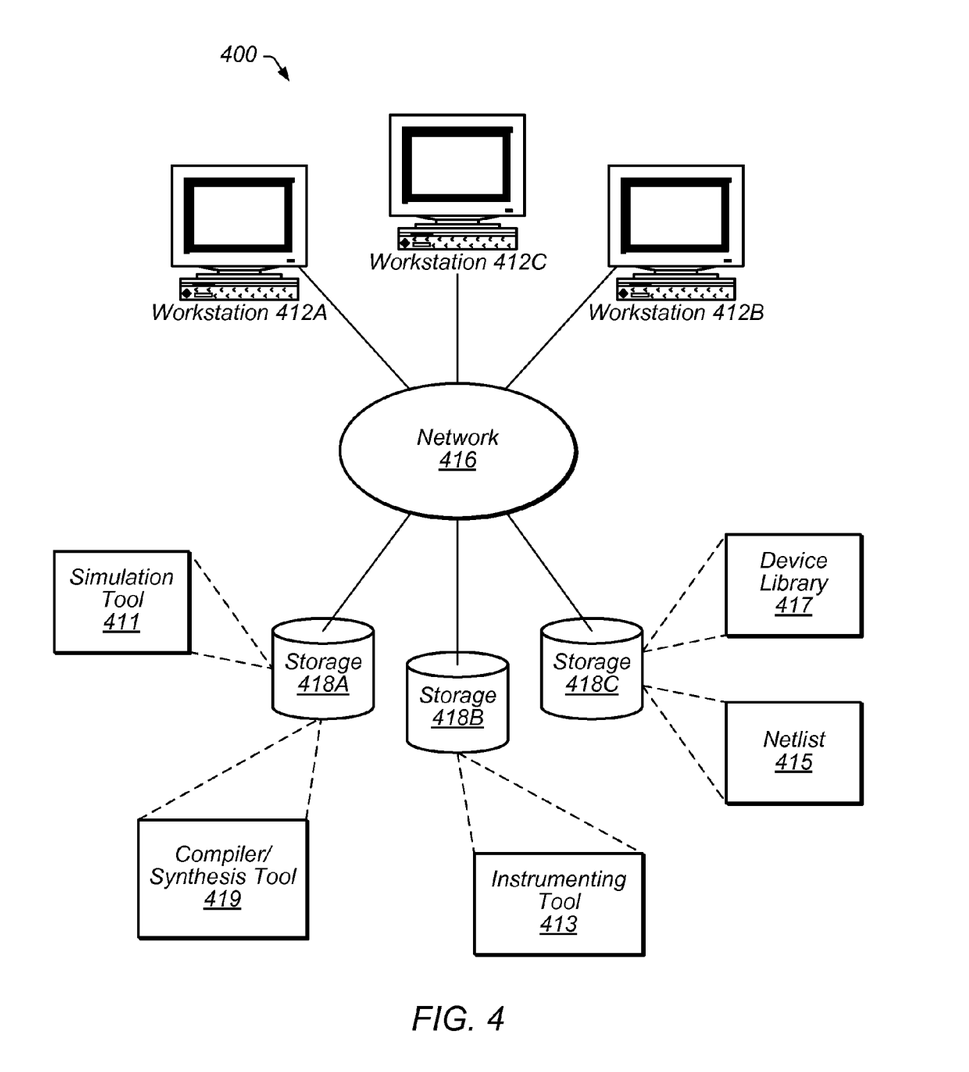
FIG. 4 is a block diagram of one embodiment of a computer system used to implement a design tool for generating a power estimate.

FIG. 4 shows a block diagram of one embodiment of a computer system used to implement a design tool for generating a power estimate. The computer system 400 includes a plurality of workstations designated 412A through 412C. The workstations are coupled together through a network 416 and to a plurality of storages designated 418A through 418C. In one embodiment, each of workstations 412A-412C may be representative of any standalone computing platform that may include, for example, one or more processors, local system memory including any type of random access memory (RAM) device, monitor, input output (I/O) means such as a network connection, mouse, keyboard, monitor, and the like (many of which are not shown for simplicity).

In one embodiment, storages 418A-418C may be representative of any type of mass storage device such as hard disk systems, optical media drives, tape drives, ram disk storage, and the like. As such, the program instructions comprising the design tools may be stored within any of storages 418A-418C and loaded into the focal system memory of any of the workstations during execution. As an example, as shown in FIG. 4, the simulator tool 411 and the compiler/synthesis tool 419 are stored within storage 418A, while the instrumenting tool (e.g., measurement and report generation fife scripts) 413 is shown stored within storage 18B, and the netlist 415 and the device library 417 are stored within storage 418C. Additionally, the program instructions may be stored on a portable/removable storage media. The program instructions may be executed directly from the removable media or transferred to the local system memory or mass storages 418 for subsequent execution. As such, the portable storage media, the local system memory, and the mass storages may be referred to as non-transitory computer readable storage mediums. The program instructions may be executed by one or more processors on a given workstation or they may be executed in a distributed fashion among the workstations, as desired.

It is noted that although the computer system shown in FIG. 4 is a networked computer system, it is contemplated that in other embodiments, each workstation may also include local mass storage. In such embodiments, the program instructions and the results of the design tools may be stored locally. Further, it is contemplated that the program instructions may be executed on a standalone computer such as a personal computer that includes local mass storage and a system memory. Generally, the program instructions may be executed on any platform and/or hardware configuration conducive to storing and manipulating data and programming instructions. In some embodiments, application specific hardware modules may also be designed if desired, to implement any or all of the elements of the processes described herein, for which such implementation is possible.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for estimating power in an integrated circuit, the method comprising:
   identifying, within a netlist representing the integrated circuit, one or more transistors coupled to a voltage supply for which to estimate power;
   generating a respective measurement statement identifying by netlist name each of the one or more transistors, wherein the respective measurement statement is defined within a command syntax of a circuit simulation tool and, when evaluated by the circuit simulation tool, instructs the circuit simulation tool to generate an estimated numerical quantity of current flowing through each of the one or more transistors during a simulation of the integrated circuit;
   creating a measurement file and placing all the respective measurement statements within the measurement file, wherein the measurement file is usable by the circuit simulation tool for performing the simulation of the integrated circuit;
   running, by a computer, the simulation of the integrated circuit using the respective measurement statements in the measurement file, wherein during running of the simulation, the circuit simulation tool evaluates the respective measurement statements and generates the estimated numerical quantity of current flowing through each of the one or more transistors; and
   generating a corresponding output file indicative of estimated current flow through each of the one or more transistors.

2. The method of claim 1, further comprising:
   extracting, from the corresponding output file, results from at least some of the respective measurement statements; and
   generating a power report based on the extracted results.

3. The method of claim 2, further comprising:
   generating a graphical representation of a power estimate for the integrated circuit based on the power report.

4. The method of claim 1, further comprising:
   running the simulation of the integrated circuit and generating a corresponding log file;
   extracting, from the corresponding log file, information associated with the simulation of the integrated circuit; and
   determining whether the simulation is valid based on the extracted information.

5. The method of claim 4, wherein the information associated with the simulation of the integrated circuit comprises at least one of:
   temperature information;
   supply voltage information;
   process parameter information;
   clock frequency information; or
   operating mode information.

6. The method of claim 5, wherein the operating mode information indicates at least one of:
   a read operation;
   a write operation;
   standby operation; or
   a specific operation designated by a designer.

7. A method for estimating power in an integrated circuit comprising a plurality of modules, each module of the plurality of modules powered by a respective power rail, the method comprising:
   for each respective module of the plurality of modules:
   generating a respective netlist representing the respective module;
   identifying, within the respective netlist, one or more transistors coupled to the respective power rail which powers the respective module for which to estimate power;
   generating a respective measurement statement identifying by netlist name each of the one or more transistors, wherein the respective measurement statement is defined within a command syntax of a circuit simulation tool and, when evaluated by the circuit simulation tool, instructs the circuit simulation tool to generate an estimated numerical quantity of current flowing through each of the one or more transistors during a simulation of the respective module;
   creating a respective measurement file and placing all the respective measurement statements within the respective measurement file, wherein the respective measurement file is usable by the circuit simulation tool for performing the simulation of the respective module;
   simulating, by a computer, the respective module using the respective measurement statements in the respective measurement file, wherein during simulating, the circuit simulation tool evaluates the respective measurement statements and generates the estimated numerical quantity of current flowing through each of the one or more transistors; and
   generating a corresponding respective output file indicative of estimated current flow through each of the one or more transistors.

8. The method of claim 7, further comprising:
   for each respective module:
   extracting, from the corresponding respective output file, results from at least some of the respective measurement statements; and
   generating a respective power report based on the extracted results.

9. The method of claim 8, further comprising:
   combining the respective power reports corresponding to the plurality of modules into a single power report corresponding to the integrated circuit.

10. The method of claim 7, further comprising:
    for each respective module:
    running the simulation of the respective module, and generating a corresponding respective log file;
    extracting, from the corresponding respective log file, information associated with the simulation of the respective module; and determining whether the simulation is valid based on the extracted information.

11. A system comprising:
one or more processing units configured to execute programming instructions; and
one or more memory elements configured to store programming instructions executable by the one or more processing units to:
generate a netlist representing an integrated circuit;
identify, within the netlist, one or more transistors coupled to a voltage supply for which to estimate power;
generate a respective measurement statement identifying by netlist name each of the one or more transistors, wherein the respective measurement statement is defined within a command syntax of a circuit simulation tool and, when evaluated by the circuit simulation tool, instructs the circuit simulation tool to generate an estimated numerical quantity of current flowing through each of the one or more transistors during a simulation of the integrated circuit;
create a measurement file, and place all the respective measurement statements within the measurement file, wherein the measurement file is usable to perform the simulation of the integrated circuit; and
run the simulation of the integrated circuit using the respective measurement statements in the measurement file, wherein during running of the simulation, the circuit simulation tool evaluates the respective measurement statements and generates the estimated numerical quantity of current flowing through each of the one or more transistors.

12. The system of claim 11, wherein the one or more memory elements are further configured to store programming instructions executable by the one or more processing units to:
generate a corresponding output file;
extract, from the corresponding output file, current measurement results obtained according to the respective measurement statements; and
generate a power report based on the extracted current measurement results.

13. The system of claim 11, wherein at least one of the one or more memory elements is situated remotely with respect to the one or more processing units.

14. The system of claim 11, wherein the integrated circuit corresponds to one of a plurality of modules in an integrated circuit design, wherein a respective integrated circuit corresponds to each respective module of the plurality of modules in the integrated circuit design, and wherein each respective module is powered by a respective voltage supply;
wherein the one or more memory elements are further configured to store programming instructions executable by the one or more processing units to:
generate a respective netlist representing the respective integrated circuit corresponding to each respective module;
identify, within the respective netlist, transistors coupled to the respective voltage supply powering the respective module;
generate a respective measurement statement identifying by netlist name each transistor of the transistors, wherein the respective measurement statement is usable to estimate a current flowing through each of the identified transistors during a simulation of the respective integrated circuit corresponding to the respective module; and
create a respective measurement file, and place all the respective measurement statements within the respective measurement file, wherein the respective measurement file is usable to perform the simulation of the respective integrated circuit corresponding to the respective module.

15. The system of claim 14, wherein the one or more memory elements are further configured to store programming instructions executable by the one or more processing units to:
run the simulation of each respective integrated circuit, and generate a corresponding respective output file;
extract, from each corresponding respective output file, current measurement results obtained according to the respective measurement statements; and
generate a respective power report based on the extracted current measurement results for each respective module.

16. The system of claim 14, wherein the one or more memory elements are further configured to store programming instructions executable by the one or more processing units to:
generate a master power report by combining all respective power reports.

17. The system of claim 14, wherein the one or more memory elements are further configured to store programming instructions executable by the one or more processing units to:
generate a respective log file corresponding to the simulation of each respective integrated circuit;
extract, from each respective log file, information associated with the simulation of the respective integrated circuit to which the respective log file corresponds; and
determine whether the simulation of the respective integrated circuit is valid based on the extracted information.

18. The system of claim 14, wherein at least two of the respective voltage supplies are configured to supply voltages having different values.

19. A non-transitory computer readable memory medium configured to store programming instructions executable to:
identify, in a netlist representing an integrated circuit, transistor devices that are coupled to a voltage supply configured to provide a supply voltage to the integrated circuit;
generate respective measurement statements identifying by netlist name each respective transistor device of the identified transistor devices, wherein each respective measurement statement is defined within a command syntax of a circuit simulation tool and, when evaluated by the circuit simulation tool, instructs the circuit simulation tool to generate an estimated numerical quantity of current flowing through a respective one of the identified transistor devices during a simulation of the integrated circuit;
create a measurement file, and place each respective measurement statement into the measurement file, wherein the measurement file is usable to perform the simulation of the integrated circuit; and
run the simulation of the integrated circuit using the respective measurement statements in the measurement file, wherein during running of the simulation, the circuit simulation tool evaluates the respective measurement statements and generates the estimated numerical quantity of current flowing through each of the identified transistor devices.

20. The non-transitory computer readable memory medium of claim 19, further configured to store programming instructions executable to:
- extract, from an output file corresponding to the simulation of the integrated circuit, current measurement results obtained according to one or more of the respective measurement statements.

21. The non-transitory computer readable memory medium of claim 20, further configured to store programming instructions executable to:
- generate a power report based on the extracted current measurement results.

22. The computer readable memory medium of claim 21, further configured to store programming instructions executable to:
- calculate power information to include in the power report based on the extracted current measurement results and the supply voltage.

23. The non-transitory computer readable memory medium of claim 19, further configured to store programming instructions executable to:
- extract, from a log file corresponding to the simulation of the integrated circuit, information associated with the simulation of the integrated circuit; and
- determine whether the simulation of the integrated circuit is valid based on the extracted information.

* * * * *